United States Patent [19]

Koyama et al.

[11] Patent Number: 4,818,606
[45] Date of Patent: Apr. 4, 1989

[54] HIGHLY RUNNING-ENDURANT MAGNETIC RECORDING MEDIUM

[75] Inventors: Noboru Koyama; Shu Ishiguro; Ryosuke Isobe, all of Hino, Japan

[73] Assignee: Konica Corporation, Tokyo, Japan

[21] Appl. No.: 127,919

[22] Filed: Dec. 2, 1987

[30] Foreign Application Priority Data

Dec. 2, 1986 [JP] Japan .................. 288272
Apr. 4, 1987 [JP] Japan .................... 87777

[51] Int. Cl.⁴ .............. G11B 5/70; G11B 5/706; G11B 5/708
[52] U.S. Cl. .................. 428/323; 428/329; 428/402; 428/408; 428/694; 428/695; 428/900
[58] Field of Search .......... 428/408, 695, 329, 900, 428/402, 323

[56] References Cited

U.S. PATENT DOCUMENTS

| | | | |
|---|---|---|---|
| 4,132,827 | 1/1979 | Mukaida | 428/329 |
| 4,439,486 | 3/1984 | Yamada | 428/332 |
| 4,539,257 | 9/1985 | Ryoke | 428/900 |
| 4,546,038 | 10/1985 | Yamaguchi | 428/695 |
| 4,551,386 | 11/1985 | Yamaguchi | 428/900 |
| 4,562,117 | 12/1985 | Kikukawa | 428/407 |
| 4,626,469 | 12/1986 | Yamaguchi | 428/323 |
| 4,629,646 | 12/1986 | Ide | 428/900 |
| 4,647,503 | 3/1987 | Yamaguchi | 428/328 |
| 4,654,258 | 3/1987 | Kawamata | 428/695 |
| 4,696,859 | 9/1987 | Miyoshi | 428/694 |

*Primary Examiner*—Paul J. Thibodeau
*Attorney, Agent, or Firm*—Jordan B. Bierman

[57] ABSTRACT

A magnetic recording medium comprising a nonmagnetic support having thereon a magnetic recording layer comprising a magnetic layer containing ferromagnetic metal powder wherein the magnetic metal powder has a BET specific surface area of not less than 40 m²/g and the magnetic recording layer contains a fatty acid having a neutralization value of not more than 250, an ester of fatty acid and a carbon black having a DBP oil absorption of not less than 110 ml/100 g and an average particle size of not more than 60 mμ. The magnetic recording medium is improved on the electromagnetic conversion property as well as on the running endurance.

24 Claims, 2 Drawing Sheets

HIGHLY RUNNING-ENDURANT MAGNETIC RECORDING MEDIUM

FIELD OF THE INVENTION

The present invention relates to a magnetic recording medium such as magnetic tape, and more particularly to a high-density recording magnetic tape which is improved on the electromagnetic conversion property as well as on the running endurance.

BACKGROUND OF THE INVENTION

In magnetic recording media, as demands for higher-density recording have lately been raised, ferromagnetic metal powdery materials comprised principally of such metals as iron, nickel and cobalt has come into common use in place of those ferromagnetic powdery materials which had conventionally been in use. Particularly in video tape, with the utilization of a method of shortening the recording wavelength or narrowing the track width, extremely high-density video recording has become essential, so that video tape comprising a ferromagnetic metal powdery material in place of the conventional iron oxide-type ferromagnetic powdery material has come into use. In the case where a ferromagnetic metal powdery material is used, it is known that by smoothing the magnetic layer surface, even higher-density video recording can be performed and also the electromagnetic conversion property of a magnetic recording medium can be improved.

However, if the magnetic layer surface is smoothed, particularly while video tape is running, the contact friction resistance between the magnetic layer and the apparatus system increases, and as a result, the magnetic layer of a magnetic recording medium tends to be damaged or peeled off. Especially in video tape, there are cases where its magnetic layer is put under such a severe condition as in the still mode, and an increase in the coefficient of friction of the magnetic layer causes the life of the magnetic layer specially in the still mode to be shortened. Accordingly, improvement of the endurance of the magnetic layer of video tape while running is unrgently needed.

As a conventional measure to improve the running endurance of a magnetic layer, there is proposed a method of adding an abrasive (hard particles) such as corundum, silicon carbide, chromium oxide or the like to the magnetic layer.

The above-mentioned friction resistance is determined according to the product of the coefficient of friction multiplied by the contact area of a contact surface. Therefore, the addition of an abrasive to a magnetic layer to roughen its contact surface to thereby reduce the contact area of the contact surface which is to come into contact with a guide pole or the like enables to lessen the friction resistance. For example, Japanese Patent Publication Open to Public Inspection (hereinafter referred to as Japanese Patent O.P.I. Publication) Nos. 130234/1982, 161135/1983, 53825/1982 and 2415/1983 disclose examples of the use of inorganic powdery abrasives, most of which examples specify the use of abrasives limited to those of certain particle sizes. There also are other proposals for the use of carbon black in lieu of the aforementioned inorganic powdery materials, one of which proposals is found in, for example, Japanese Patent Examined publication No. 17401/1977. This is aimed at both the antistatic effect based on the conductivity of carbon black and the surface roughening effect due to its particles, but is disadvantageous in respect that such effects are not always adequately obtained and it rather deteriorates not only the runnability but also the electromagnetic conversion property.

For example, there are known those techniques to improve separately individual characteristics such as the conductivity, friction (runnability), surface characteristic, and wear resistance (as described in Japanese Patent Examined Publication No. 15052/1981 for the conductivity, Japanese Patent Examined Publication No. 20203/1978 for the wear resistance (runnability), and Japanese Patent O.P.I. Publication No. 51025/1981 for the surface characteristic (electromagnetic conversion property). However, in these techniques of the prior art, the dispersibility of magnetic powder is poor and the running endurance of the medium is inadequate, and the oil absorption of carbon black itself is as high as to tend to form a structural construction to increase the viscosity of a magnetic coating liquid, thus deteriorating the physical property of the coating liquid, whereby the electromagnetic conversion property is deteriorated.

There are also known other techniques to use in combination two or more kinds of carbon black different in the nature in order to satisfy the above-mentioned respective characteristics at the same time (as described in Japanese Patent O.P.I. Publication Nos. 5426/1984 and 16141/1984, and Japanese Patent Examined Publication Nos. 20203/1978 and 9041/1979). However, the techniques disclosed in these publications are still not sufficient to satisfy the above characteristics at the same time.

Further, in the case where an abrasive is to be added to a magnetic layer for the purpose of improving the running endurance of the magnetic layer, a fairly large amount of the abrasive has to be added in order to produce satisfactory results of the addition. The magnetic layer to which has been added a fairly large amount of the abrasive, however, causes a magnetic head and others to conspicuously wear down, and runs counter to the purpose of improving the electromagnetic conversion property by smoothing the magnetic layer, so that this method is not considered acceptable.

And, in video tape, the high-density recording, which is made with its recording wavelength shortened or with its track width narrowed, on the other hand, increases the occurrence of drop-out. The increase in the occurrence of the drop-out can be reduced to some extent by making the magnetic layer surface supersmooth or mirror-like smooth. However, providing the magnetic layer with a mirror-like surface is accompanied by the problem that the running endurance must be improved.

SUMMARY OF THE INVENTION

It is an object of the present invention to provide a magnetic recording medium which is improved on both electromagnetic conversion property and running endurance and which causes little or no drop-out phenomenon, and particularly to provide a magnetic recording medium which shows an excellent electromagnetic conversion property without impairing the surface characteristic thereof and also shows an excellently stable running endurance and wear resistance even under such a severe condition as in the still mode, and causes little or no drop-out phenomenon.

The above object of the present invention is accomplished by a magnetic recording medium comprising a nonmagnetic support having thereon a magnetic recording layer comprising a magnetic layer containing ferromagnetic metal powder wherein the ferromagnetic metal powder has a BET specific surface area of not less than 40 m$^2$/g and the magnetic recording layer contains a fatty acid having a neutralization value of not more than 250, an ester of fatty acid and a carbon black having a DBP oil absorption of not less than 110 ml/100 g and an average particle size of not more than 60 m$\mu$.

BRIEF DESCRIPTION OF THE DRAWINGS

The drawings show examples of the present invention.

DETAILED DESCRIPTION OF THE INVENTION

Figure 1:
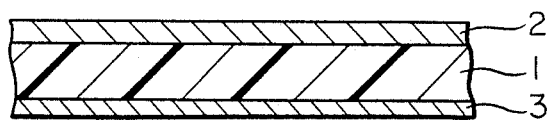
FIGS. 1, 2 and 3 are enlarged partially sectional views of magnetic recording mediums of the respective examples.

In the embodiment of the present invention, the aforementioned ferromagnetic metal powdery material is desirable to contain aluminum.

The fatty acid and fatty acid ester of this invention may be present in the magnetic layer and protective layer or, by coating a solution of both acid and ester, may be present on the same side as the magnetic layer on a support.

The present invention will now be detailed below:

The ferromagnetic metal powdery material to be contained in the magnetic layer of the magnetic recording medium of this invention needs to be of a BET specific surface area of not less than 40 m$^2$/g, and if one having a specific surface area of from 45 m$^2$/g to 90 m$^2$/g is used, the electromagnetic conversion property can be improved significantly. And the ferromagnetic metal powdery material is desirable to be one whose pH as an isoelectric point is not less than 8.0.

Examples of the magnetic metal powdery material usable in the magnetic layer of the magnetic recording medium of this invention include such metal powdery materials comprised principally of Fe, Al, Ni and Co as Fe-Al alloy, Fe-Al-P alloy, Fe-Ni-Co alloy, Fe-Mn-Zn alloy, Fe-Ni-Zn alloy, Fe-Co-Ni-Cr alloy, Fe-Co-Ni-P alloy, Co-Ni alloy, Co-P alloy, and the like. Of these metal powdery materials, the ones containing Al are preferred.

Measurement of the pH as an isoelectric point of a ferromagnetic metal powdery material to be used in the magnetic layer of the magnetic recording medium of this invention may be made, for example, in the manner that an electrolyte (such as HCl, NaCl) is added to 100 ml of water, the pH of the solution is first settled to an appropriate value, to the solution is added 0.1 g of a metallic magnetic powdery material to be dispersed therein, and this is measured in usual manner with respect to zeta potential, and then the pH value obtained when the zeta potential becomes zero (isoelectric point) is regarded as the pH as the isoelectric point.

Examples of the fatty acid having a neutralization value of not more than 250, preferably 110 to 250, to be used in this invention include saturated fatty acids such as myristic acid, palmitic acid, stearic acid, arachic acid, behenic acid, lignoceric acid, cerotic acid, montanic acid, melissic acid and the like, and unsaturated fatty acids such as tsuzuic acid, 5-myristoleic acid, myristoleic acid, 9-palmitoleic acid, petroselinic acid, oleic acid, elaidic acid, gadoleic acid, gondoic acid, cetoleic oil acid, erucic acid, brassidic acid, selacholeic acid, and the like. These fatty acids may be used alone or in a mixture. The term 'neutralization value' used herein implies the milligram number of potassium hydroxide required to neutralize 1 g of a fatty acid.

Examples of the foregoing fatty acid ester to be used in combination with the fatty acid include methyl esters, ethyl esters, propyl esters and butyl esters of saturated or unsaturated fatty acids such as tridecylic acid, lauric acid, undecylic acid, capric acid, erucic acid, cetoleic acid, elaidic acid, oleic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, and the like. These fatty acid esters may be used alone or in a mixture.

The above fatty acid and fatty acid ester of this invention may be added normally in an amount of not more than 10 parts by weight to 100 parts by weight of a ferromagnetic metal powdery material, and preferably in the range of from 1 part by weight to 9 parts by weight. The total amount of the fatty acids to be used normally accounts for 1/10 to 9/10 of the gross weight of the fatty acids and fatty acid esters to be used.

The magnetic layer of the magnetic recording medium of this invention needs to contain carbon black having a specific average particle size and a specific DBP oil absorption. The average particle size of the carbon black to be used is required to be not more than 60 m$\mu$. If the average particle size exceeds the above range, the surface of the magnetic layer becomes rough, the electromagnetic conversion property becomes deteriorated, and further the drop-out trouble tends to often occur. The DBP oil absorption of the carbon black to be used is required to be not less than 110 ml/100 g, preferably from 111 to 500 ml/100 g, and particularly preferably from 160 ml to 300 ml/100 g. Further, the specific surface area of the carbon black is desirable to be from 15 m$^2$/g to 90 m$^2$/g in terms of BET values.

The adding proportion of the above carbon black to the ferromagnetic metal powdery material is normally not more than 10% by weight of the weight of the material, and preferably from 0.1% by weight to 6% by weight.

The above carbon black (hereinafter referred to as a first carbon black) is desirable to be used alone or in a mixture with other carbon black (hereinafter referred to as a second carbon black) different in the property within the specific range of this invention or for other purposes such as, e.g., prevention of static electricity.

In the embodiment of this invention containing the second carbon black, both the first carbon black and the second carbon black having BET values and oil absorptions in their respective ranges are used together, so that it has now been found that the aforementioned disadvantages of the prior art can be further improved. As the second carbon black, a carbon black having a BET specific surface area of preferably from 50 m$^2$/g to 900 m$^2$/g, particularly preferably from 50 m$^2$/g to 400 m$^2$/g, and also having a DBP oil absorption of preferably not more than 110 ml/100 g, particularly preferably from 20 ml/100 g up to 110 ml/100 g, may be used. That is, the second carbon black, since its BET value is as relatively large as from 50 $m^2/g$ to 900 $m^2/g$, tends to cause the magnetic recording medium to show a high packing-density video recording capability and a high electromagnetic conversion property, and moreover, its dispersibility is satisfactorily maintained particularly by its own high oil absorbability. In addition to this, the use of the first carbon black, whose average particle size is not more than 60 m$\mu$ and whose BET value is as relatively small as from 15 to 80 $m^2/g$, is effective in reducing the coefficient of friction. Furthermore, regarding the improvement of the conductivity, the first carbon black, since it shows an oil absorption of not less than 110 ml/100 g, relatively easily form a structural construction, thus enabling to obtain both a high conductivity and a low friction.

Particularly, the second carbon black, when having a high BET value and a small oil absorption, forms no structural construction. Such the carbon black, even when its adding amount is increased, does not roughen the surface of the magnetic recording medium. The first carbon black, since it has a low BET value but has a large oil absorption, very easily forms a structural construction. Such the carbon, when present uniformly on the surface of the magnetic recording medium, reduces the coefficient of friction (however, an excessively large oil absorption is undesirable because it increases the viscosity of the magnetic coating liquid). The first carbon black has a high conductivity, but, when dispersed into a magnetic layer, shows no conductivity. However, the first carbon black, when used in combination with the second carbon black, shows a conductivity. This is considered probably because the second carbon black fills up the gaps of the structure formed by the first carbon black.

The BET value of the above second carbon black is preferably from 50 $m^2/g$ to 400 $m^2/g$.

In the present invention, in order to obtain the above-mentioned effect, the adding amount of the carbon black, in the total amount of the first and second carbon blacks, is preferably 1 to 20 parts by weight to 100 parts by weight of a magnetic powdery material, more preferably 1.5 to 15 parts by weight, and most preferably 2 to 10 parts by weight. There is also a desirable proportional range of both carbon blacks: the preferred proportion by weight of the second carbon black to the first carbon black is in the range of from 5:5 to 9.99:0.01.

Useful examples of the second carbon black to be used in this invention include, e.g., Raven-1035 (BET: 95 $m^2/g$, DBP: 56 ml/100 g) and Raven-1255 (BET: 125 $m^2/g$, DBP: 56 ml/100 g) produced by Columbian Carbon; Black Pearls-1000 (BET: 343 $m^2/g$, DBP: 104 ml/100 g) by Cabot; CF-9 (BET: 60 $m^2/g$, DBP: 65 ml/100 g) by Mitsubishi Chemical Industry Co.; and the like. Useful examples of the first carbon black include, e.g., HS-100 (BET: 32 $m^2/g$, DBP: 180 ml/100 g, particle size: 53 m$\mu$) produced by Denka Co.; #22D (BET: 55 $m^2/g$, DBP: 131 ml/100 g, particle size: 40 m$\mu$), #20B (BET: 56 $m^2/g$, DBP: 115 ml/100 g, particle size: 40 m$\mu$), #3500 (BET: 47 $m^2/g$, DBP: 187 ml/100 g, particle size: 40 m$\mu$) by Mitsubishi Chemical Industry Co.; and the like.

The aforementioned term 'BET specific surface area' implies the surface area per unit weight, and is a physical amount quite different from the average particle size; for example, there exist particulate materials which are quite the same in the average particle size but differ in the specific surface area. Measurement of the BET specific surface area may be made in the manner that, for example, a magnetic powdery material is first subjected to heat treatment at 250° C. for 30 to 60 minutes for deaeration to thereby have adsorbates removed therefrom, and then is conducted into a measuring instrument with its initial pressure of nitrogen thereinside being settled to 0.5 kg/$m^2$, whereby an adsorption measurement takes place with nitrogen at the liquid nitrogen temperature ($-195°$ C.) (the BET specific surface area measuring method which is generally called 'B.E.T. Method': for more details, reference can be made to J. Ame. Chem. Soc. 60 309 (1938)). As the measuring instrument for use in measuring the specific surface area, BET value, a powder-fluid measuring instrument 'Quantasorb' (jointly manufactured by Yuasa Battery Co. and Yuasa Ionics Co.) may be used. General explanation about the specific surface area and its measuring method is described in detail in the 'Funtai no Sokutei' ('Measurement of Powder') (by J. M. Dallavalle and Clydeorr Jr; translated into Japanese by Benda et al; published by Sangyo Tosho Publishing Co.), and also in the 'Kagaku Benran' ('Handbook of Chemistry') (Practical Application Section, pp. 1170–1171, compiled by the Chemical Society, Japan; published on Apr. 30, 1966 by Maruzen Ltd.) (The above 'Kagaku Benran' uses merely 'surface area ($m^2/g$)' for the 'specific surface area', but the 'surface area' is identical in meaning with the term 'specific surface area' used in this specification.).

Regarding the above-mentioned 'oil absorption (DBP method)', DBP (dibutyl phthalate) is little by little added to 100 g of a powdery pigment, and the condition of the pigment is observed while being kneaded with the DBP, and the ml value of the DBP at the point of time when the pigment turns from the scatteredly dispersed state into lumps is regarded as a DBP oil absorption.

In the present invention, the magnetic layer, protective layer, backcoat layer or other component layers of the magnetic recording tape of this invention may be formed by utilizing conventional techniques.

The magnetic layer of the magnetic tape of this invention is a disperse-type magnetic layer formed by coating a coating liquid containing magnetic powder, the foregoing fatty acid and fatty acid ester, a binder and a dispersing agent and the like.

As the binder usable in this invention, a wear-resistant polyurethane may be used. This has an excellent adhesive strength, and is as mechanically strong as can withstand a repeatedly applied stress or bending force, and is also excellently wear-resistant and weatherproof.

In addition to the polyurethane, if a cellulose-type resin and a vinyl chloride-type copolymer also are incorporated into the magnetic layer, then the dispersibility of the magnetic powder inside the magnetic layer is improved to thereby increase the mechanical strength of the magnetic layer. In this instance, however, when the cellulose-type resin and vinyl chloride-type copolymer alone are incorporated, the magnetic layer becomes hard to excess, but this can be prevented by the incorporation of the above polyurethane.

Useful examples of the cellulose-type resin include cellulose ethers, cellulose inorganic acid esters, cellulose organic acid esters, and the like. The above-mentioned vinyl chloride-type copolymer may be one that is partially hydrolyzed. Examples of the vinyl chloride-type copolymer are preferably those copolymers containing a vinyl chloride-vinyl acetate unit.

A phenoxy resin may also be used. The phenoxy resin has the advantage that it has a high mechanical strength and is excellent in the dimensional stability as well as in the heat resistance, water resistance and chemical resistance.

The foregoing polyurethane, cellulose-type resin or vinyl chloride-type resin may have a hydrophilic polar group such as $-SO_3M$, $-PO(OM)_2$, $-COOM$ (wherein M is hydrogen or an alkali metal), or the like.

These binder materials may make up for one another and cooperate with one another to significantly raise the time stability of the tape's physical property.

In addition to the above binder materials, those resins usable generally for magnetic recording media or various modified resins or a mixture of these resins with such resins characterized by their behavior as thermoplastic resins, thermosetting resins, reactive-type resins, or electron-beamsetting resins may also be used.

In order to improve the endurance of component layers such as the magnetic layer of the magnetic tape of this invention, various hardening agents such as, for example, isocyanates, may be incorporated into such layers.

Usable aromatic isocyanates include, e.g., tolylenediisocyanate (TDI) and other equivalents and addition products of these isocyanates with active hydrogen compounds. Regarding the average molecular weight, those having an average molecular weight of from 100 to 3,000 may be suitably used.

Useful aliphatic isocyanates include hexamethylenediisocyanates (HMDI) and other equivalents and addition products of these isocyanates with active hydrogen compounds. The most preferred among these aliphatic isocyanates and addition products of these isocyanates with active hydrogen compounds are those having a molecular weight of from 100 to 3,000. Among these aliphatic isocyanates, nonalicyclic isocyanates and addition products of these compounds with active hydrogen compounds are preferred.

The magnetic coating liquid for use in forming the foregoing magnetic layer may, if necessary, contain additives such as dispersing agents, lubricants other than the foregoing carbon black, fatty acid, etc., antistatic agents, abrasives, matting agents and the like.

Examples of the dispersing agent to be used in this invention include amine compounds, alkyl sulfates, fatty acid amides, higher alcohols, polyethylene oxides, sulfosuccinic acid, sulfosuccinates, known surface active agents and salts thereof. These dispersing agents may be used alone or in combination of two or more different types of them. Any of these dispersing agents is to be added in the range of from 1 to 20 parts by weight to 100 parts by weight of a magnetic powdery material. Any of these dispersing agents may be used also for the pretreatment of the magnetic powdery material.

As the lubricant, silicone oil, graphite, carbon black graft polymer, molybdenum disulfide, tungsten disulfide, or the like may also be used if necessary. Any of these lubricants is to be added in the range of from 0.2 to 20 parts by weight to 100 parts by weight of a magnetic powdery material.

As the abrasive, those generally usable materials may be used which include fused alumina, silicon carbide, chromium oxide, corundum, artificial corundum, diamond, artificial diamond, garnet, emery (principal constituents: corundum and magnetite) and the like.

These abrasives are to be used in the average particle size range of from 0.05 to 5 $\mu$m, and particularly preferably from 0.1 to 2 $\mu$m. Any of these abrasives may be added in the range of from 1 to 20 parts by weight to 100 parts by weight of a magnetic powdery material.

As the matting agent, organic powdery materials or inorganic powdery materials may be used alone or in a mixture.

As the organic powdery material to be used in this invention, acrylstyrene-type resin powder, benzoguanamine-type resin powder, melamine-type resin powder and phthalocyanine-type pigment powder are preferred, but polyolefin-type resin powder, polyester-type resin powder, polyamide-type resin powder, polyimide-type resin powder, polyethylene fluoride-type resin powder and the like may also be used. Examples of the inorganic powdery material as the matting agent include silicon oxide, titanium oxide, aluminum oxide, calcium carbonate, barium sulfate, zinc oxide, tin oxide, chromium oxide, silicon carbide, calcium carbide, $\alpha$-$Fe_2O_3$, talc, kaolin, calcium sulfate, boron nitride, zinc fluoride, and molybdenum dioxide.

Examples of the antistatic agent include, in addition to carbon black, those conductive powdery materials such as graphite, tin oxide-antimony oxide-type compounds, titanium oxide-tin oxide-antimony oxide-type compounds, etc.; natural surface active agents such as saponin and the like; nonionic surface active agents such as alkylene oxide-type, glycerol-type, and glycidol-type compounds; cationic surface active agents such as higher alkylamines, quaternary ammonium salts, pyridine and other heterocyclic compounds, phosphoniums and sulfoniums, etc.; anionic surface active agents containing acidic groups such as carboxylic acid group, sulfonic acid group, phosphoric acid group, sulfate group, phosphate group, etc.; and amphoteric surface active agents such as amino acids, amonosulfonic acids, sulfates and phosphates of amino-alcohols, and the like.

Examples of the solvent for use in preparing the foregoing coating liquid or for use in diluting the coating liquid at the time of coating include ketones such as acetone, methylethyl ketone, methyl-isobutyl ketone, cyclohexanone, etc.; alcohols such as methanol, ethanol, propanol, butanol, etc.; esters such as methyl acetate, ethyl acetate, butyl acetate, ethyl lactate, ethylene glycol monoacetate, etc.; ethers such as glycol-dimethyl ether, glycol-monoethyl ether, dioxane, tetrahydrofuran, etc.; aromatic hydrocarbons such as benzene, toluene, xylene, etc.; halogenated hydrocarbons such as methylene chloride, ethylene chloride, carbon tetrachloride, chloroform, dichlorobenzene, etc.; and the like.

Useful examples of the material to be used as the support include polyesters such as polyethylene terephthalate, polyethylene-2,6-naphthalate, etc.; polyolefins such as polypropylene,etc.; cellulose derivatives such as cellulose triacetate, cellulose diacetate, etc.; and plastics such as polyamides, polycarbonates, etc. In addition to these materials, metals such as Cu, Al, Zn, etc., glass plates, boron nitride, silicon carbide, ceramics, and the like may also be used.

The thickness of any of these support materials, if in the sheet form, should be about 3 to 100 $\mu$m, and preferably from 5 to 50 $\mu$m, and, if in the disc or card form, should be about 30 $\mu$m to 10 mm. Where the support is to be of a drum type, it is used in the cylindrical form. Thus, the form of the support should be determined according to the recorder used.

Examples of the coating method for forming the foregoing magnetic layer on the support include the processes of the air doctor coating, blade coating, air knife coating, squeeze coating, dipping coating, reverse roll coating, transfer roll coating, gravure coating, kiss coating, cast coating, spray coating and the like, but are not limited thereto.

The embodiment of the magnetic recording medium of this invention will be illustrated below by the drawings.

For example, as is shown in FIG. 1, on a support 1 is provided a magnetic layer 2, and on the reverse side of the support to magnetic layer 2 is provided a BC layer 3. This BC layer may or may not be provided. The magnetic layer contains the aforementioned metal magnetic powder and the first and second carbon blacks, and further may contain a lubricant (such as, e.g., silicone oil, graphite, molybdenum disulfide, tungsten disulfide or the like) and also nonmagnetic abrasive particles. As the abrasive, alumina (such as $\alpha$-Al$^2$O$^3$ (corundum)), artificial corundum, fused alumina, silicon carbide, chromium oxide, diamond, artificial diamond, garnet, emery (principal substituents: corundum and magnetite) or the like may be used. The abrasive content is preferably not more than 20 parts by weight to the weight of the magnetic powdery material, and its average particle size is preferably not more than 0.5 $\mu$m, and more preferably not more than 0.4 $\mu$m.

As the binder for the magnetic layer, as has been mentioned earlier, a polyurethane may be used, which can be synthesized by the reaction between a polyol and a polyisocyanate. If a phenoxy resin and/or a vinyl chloride-type copolymer also are incorporated along with the polyurethane into the magnetic layer, the magnetic powder's dispersibility can be improved, thereby increasing the layer's mechanical strength, provided, however, that the use of the phenoxy resin and/or vinyl chloride-type copolymer alone causes the layer to be hard to excess, but this can be prevented by the presence of the polyurethane, leading to the improvement of the adherence of the layer to the support or to the subbing layer. Aside from the above-mentioned materials, a cellulose-type resin, thermoplastic resin, thermosetting resin, reactive-type resin, or electron-beam-setting resin may also be used as the binder resin.

To BC layer 3 may also be added the same carbon blacks, fatty acid and its ester as those used in magnetic layer 2.

The magnetic recording medium shown in FIG. 1 may be one having a subbing layer (not shown) between magnetic layer 2 and support 1, or the subbing layer may not be provided (the same shall apply hereinafter). Alternatively, the support may be subjected to corona discharge treatment.

As the support 1, any of those previously mentioned various materials may be used.

Figure 2:
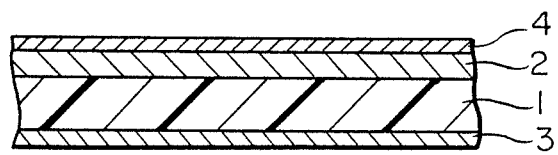

FIG. 2 shows another example of the magnetic recording medium, wherein an overcoating layer or an OC layer 4 is provided on magnetic layer 2 of the medium of FIG. 1. OC layer 4 is provided for the purpose of protecting magnetic layer 2, so that the surface of OC layer 4 is required to be adequately smooth. Accordingly, as the binder resin for the OC layer, the foregoing urethane resin for use in forming magnetic layer 2 may be used (preferably in combination with a phenoxy resin and/or a vinyl chloride-type copolymer). The surface roughness of OC layer 4, especially in connection with color S/N, should be of Ra$\leq$0.01 $\mu$m and Rmax$\leq$0.13.

In this instance, support 1 is desirable to be a smooth support with its surface roughness being of Ra$\leq$0.01 $\mu$m and Rmax$\leq$0.01.

Figure 3:
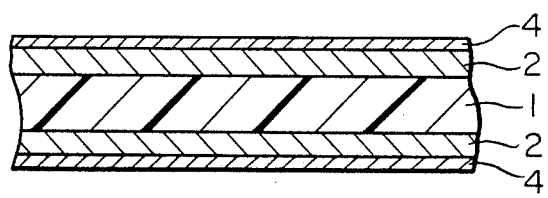

FIG. 3 shows a magnetic recording medium that is constructed to be a magnetic disc, wherein magnetic layer 2 and OC layer 4, both similar to those described above, are provided on both sides of support 1. OC layer 4 may contain a binder resin comprised principally of the aforementioned urethane resin.

EXAMPLES

The present invention will be illustrated in detail by the following examples of this invention. The term 'part(s)' used hereinafter all represents part(s) by weight.

Samples 1 to 3 and Comparative Samples 1 to 3 were prepared.

SAMPLE 1

| Magnetic Coating Composition: | |
|---|---|
| Ferromagnetic metal powder (specific surface area: 40 m$^2$/g) | 100 parts |
| Vinyl chloride/vinyl acetate copolymer | 13 parts |
| Polyurethane resin | 7 parts |
| $\alpha$-Al$_2$O$_3$ | 5 parts |
| Myristic acid (neutralization value: 245.7) | 1 part |
| Butyl stearate | 1 part |
| Lecithin | 3 parts |
| Carbon black (1) (average particle size: 53 m$\mu$, DBP: 180 ml/100 g, BET: 32 m$^2$/g) | 1 part |
| Cyclohexanone | 130 parts |
| Toluene | 70 parts |

The above magnetic coating composition and 3 parts of a multifunctional isocyanate as a hardening agent constituent were mixed and dispersed to thereby obtain a magnetic coating liquid. The coating liquid was coated on a 10 $\mu$m-thick polyethylene terephthalate nonmagnetic support. After that, the coated magnetic layer, before being dried, was subjected to magnetic field orientation treatment and further, after being dried, was calendered to be one having a thickness of 3 $\mu$m. This was slit into 8 mm-wide tape rolls, whereby an 8 mm-type video tape sample was prepared.

SAMPLE 2

An eight-millimeter video tape sample was prepared in the same manner as in Example 1 except that Carbon black (2) (average particles size: 16 m$\mu$, DBP: 104 ml/100 g, BET: 343 m$^2$/g) was additionally used in the magnetic coating composition of Sample 1.

SAMPLE 3

An eight-millimeter video tape sample was prepared in the same manner as in Sample 1 except that the ferromagnetic metal powder of the specific surface area of 40 m$^2$/g was replaced by one having a specific surface area of 45 m$^2$/g.

Comparative Sample 1

An eight-millimeter video tape sample was prepared in the same manner as in Example 1 except that caprylic acid (neutralization value=389.1) was used in the same quantity in place of the myristic acid.

Comparative Sample 2

An eight-millimeter video tape sample was prepared in the same manner as in Example 2 except that both the carbon blacks (1) and (2) were replaced by 5 parts of carbon black (3) (average particle size: 280 mμ. DBP: 36 ml/100 g).

Comparative Sample 3

An eight-millimeter video tape sample was prepared in the same manner as in Sample 1 except that the ferromagnetic metal powder of the specific surface area of 40 $m^2/g$ was replaced by the same quantity of one having a specific surface area of 30 $m^2/g$.

Each of these tape samples prepared in above was examined with respect to the electromagnetic conversion property, still-mode endurance (the time required until the reproduction output of a still image is dropped to 2.0 dB is indicated in minutes), drop-out occurrence frequency, and coefficient of friction thereof, and the obtained results are as given in Table 1.

TABLE 1

|  | Reproduction output (dB) | Still-mode endurance (minutes) | Drop-out frequency (per min) | Coefficient of friction |
| --- | --- | --- | --- | --- |
| Sample 1 | +1.5 | Above 120 | 10 | 0.17 |
| Sample 2 | +2.0 | Above 120 | 10 | 0.16 |
| Sample 3 | +3.0 | Above 120 | 8 | 0.16 |
| Comparative sample 1 | +0.5 | 60 | 20 | 0.50 |
| Comparative sample 2 | +0.2 | 40 | 200 | 0.20 |
| Comparative sample 3 | 0.0 | 100 | 20 | 0.30 |

The 8 mm tape samples obtained in Samples 1 and 2 are high in the reproduction output and low in the coefficient of friction and improved also on the still-mode endurance as compared with the 8 mm tape sample in Comparative Sample 1 containing the fatty acid having a neutralization value of larger than 250.

The 8 mm tape sample obtained in Sample 3 is one that uses the ferromagnetic metal powdery material having a specific surface area of 45 $m^2/g$, but is even more improved on the reproduction output than in Sample 1 and is almost equal in the still-mode endurance, coefficient of friction and drop-out frequency to Sample 1.

The sample obtained in Comparative Sample 1 is one that uses the carbon black whose average particle size is as large as 280 μm and whose DBP oil absorption is as small as 36 ml/100 g in place of the carbon black used in Sample 1, and shows a very large frequency of drop-out phenomenon and a lowered reproduction output.

The sample in Comparative Sample 3 is one that uses the ferromagnetic metal powder having a specific surface area of 30 $m^2/g$, and shows a considerably lowered reproduction output as compared with the one in Example 1.

Subsequently, samples having the magnetic coating compositions comprised of the following constituents in the proportions as given in Table 2 were prepared. The preparation was made in the following manner: Each of these compositions was dispersed by means of a ball mill to thereby obtain a magnetic powder-dispersed coating liquid, to the coating liquid were added 15 parts of a polyisocyanate, then the mixture was coated by means of an extrusion coater on one side of a 10 μm thick polyethylene terephthalate base support, and then dried. The coated layer was subsequently subjected to supercalender surface treatment, and then was slit into 8 mm-wide tape reels, whereby 8 mm video tape samples were obtained. The average thickness of the obtained magnetic layer was 3μ.

Each of the video tape samples was measured with respect to the following items, and the results shown in the following Table 3 were obtained.

RF output: A VTR deck for RF output measurement use was used to measure the RF output at 5 MHz, and the value thereof (in dB) obtained after repeating 100 times the playback of each tape is shown relatively to that of Comparative Example 1 that is regarded as reference tape.

Lumi S/N: A noise meter (925D/1), manufactured by Shibasoku Co., was used to measure the Lumi S/N of each tape. The measured value is shown in the differential from the tape of Comparative Example 1 regarded as reference tape (0 dB). The measurement took place with a high-pass filter at 4.2 MHz and a low-pass filter at 10 KHz.

Chroma S/N: Similar to RF output.

Surface resistivity: Measured by using a surface potentiometer.

Drop-out: Number of defects that have appeared on the reproduced screen image.

Shedding test: After the running of each tape, the degree of dusty matter shedding from the tape onto the head, cylinders and pinch rollers of the VTR deck was judged by the eye. In Table 3, 'A' is for almost no dusty matter, 'B' for a little dusty matter, and 'C' for conspicuous dusty matter.

TABLE 2

| Sample No. | 4 | 5 | 6 | 7 | 8 | 9 | 10 | 11 | 12 | 13 | 14 | 15 |
| --- | --- | --- | --- | --- | --- | --- | --- | --- | --- | --- | --- | --- |
| Ferromagnetic metal powder | 100 | 100 | 100 | 100 | 100 | 100 | 100 | 100 | 100 | 100 | 100 | 100 |
| Composition | Fe—Al | Fe—Al | Fe—Al | Fe—Al | Fe—Al | Fe—Al | Fe—Al | Fe—Al | Fe—Al | Fe—Al—Ni | Fe—Al | Fe—Al |
| BET ($m^2$g) | 50 | 45 | 50 | 50 | 50 | 50 | 50 | 50 | 50 | 45 | 50 | 50 |
| VC—VA copolymer | 13 | 13 | 13 | 13 | 13 | 13 | 13 | 13 | 13 | 13 | 13 | 13 |
| Polyurethane | 10 | 10 | 10 | 10 | 10 | 10 | 10 | 10 | 10 | 10 | 10 | 10 |
| Alumina | 5 | 5 | 5 | 5 | 5 | 5 | 5 | 5 | 5 | 5 | 5 | 5 |
| Myristic acid | 2 | 2 | 2 | 2 | 2 | 2 | 2 | 2 | 2 | 2 | 2 | 2 |
| Caprylic acid | — | — | — | — | — | — | — | — | — | — | — | — |
| Butyl stearate | 1 | 1 | 1 | 1 | 1 | 1 | 1 | 1 | 1 | 1 | 1 | 1 |
| Lecithin | 4 | 4 | 4 | 4 | 4 | 4 | 4 | 4 | 4 | 4 | 4 | 4 |
| Cyclohexanone | 150 | 150 | 150 | 150 | 150 | 150 | 150 | 150 | 150 | 150 | 150 | 150 |
| Toluene | 100 | 100 | 100 | 100 | 100 | 100 | 100 | 100 | 100 | 100 | 100 | 100 |
| Carbon black 1 | 1 | 1 | 1 | 1 | 4 | 2 | 1 | 1 | 1 | 1 | 1 | 1 |
| BET ($m^2$g) | 32 | 32 | 32 | 32 | 32 | 47 | 47 | 32 | 32 | 32 | 32 | 80 |
| DBP (ml/100 g) | 180 | 180 | 180 | 180 | 180 | 187 | 187 | 180 | 180 | 180 | 180 | 120 |
| Average size | 53 | 53 | 53 | 53 | 53 | 40 | 40 | 53 | 53 | 53 | 53 | 30 |
| Carbon black 2 | — | 9 | 4 | 9 | 6 | 8 | 9 | 6 | 9 | 9 | 9 | 9 |
| BET ($m^2$g) | — | 343 | 343 | 95 | 95 | 95 | 125 | 60 | 343 | 95 | 95 | 850 |

TABLE 2-continued

| DBP (ml/100 g) | — | 104 | 104 | 56 | 56 | 56 | 56 | 65 | 104 | 56 | 56 | 100 |
|---|---|---|---|---|---|---|---|---|---|---|---|---|
| Sample No. | 16 | 17 | 18 | *C-4 | C-5 | C-6 | C-7 | C-8 | C-9 | C-10 | C-11 | C-12 |
| Ferromagnetic metal powder | 100 | 100 | 100 | 100 | 100 | 100 | 100 | 100 | 100 | 100 | 100 | 100 |
| Composition | Fe—Al | Fe—Al | Fe—Al | Fe—Al | Fe—Al | Fe—Al | Fe-Al | Fe—Al | Co—$\gamma$-FeO | Fe—Al | Fe—Al | Fe—Al |
| BET (m$^2$g) | 50 | 50 | 50 | 50 | 50 | 50 | 50 | 50 | 50 | 50 | 50 | 30 |
| VC—VA copolymer | 13 | 13 | 13 | 13 | 13 | 13 | 13 | 13 | 13 | 13 | 13 | 13 |
| Polyurethane | 10 | 10 | 10 | 10 | 10 | 10 | 10 | 10 | 10 | 10 | 10 | 10 |
| Alumina | 5 | 5 | 5 | 5 | 5 | 5 | 5 | 5 | 5 | 5 | 5 | 5 |
| Myristic acid | 2 | 2 | 2 | 2 | 2 | 2 | 2 | 2 | 2 | 2 | — | 2 |
| Caprylic acid | — | — | — | — | — | — | — | — | — | — | 2 | — |
| Butyl stearate | 1 | 1 | 1 | 1 | 1 | 1 | 1 | 1 | 1 | 1 | 1 | 1 |
| Lecithin | 4 | 4 | 4 | 4 | 4 | 4 | 4 | 4 | 4 | 4 | 4 | 4 |
| Cyclohexanone | 150 | 150 | 150 | 150 | 150 | 150 | 150 | 150 | 150 | 150 | 150 | 150 |
| Toluene | 100 | 100 | 100 | 100 | 100 | 100 | 100 | 100 | 100 | 100 | 100 | 100 |
| Carbon black 1 | 1 | 2 | 1 | — | 8 | 5 | 5 | — | 1 | 5 | 1 | 1 |
| BET (m$^2$g) | 20 | 32 | 32 | — | 32 | 254 | 25 | — | 32 | 100 | 32 | 32 |
| DBP (ml/100 g) | 120 | 180 | 180 | — | 100 | 185 | 96 | — | 180 | 150 | 180 | 180 |
| Average size | 59 | 53 | 53 | — | 50 | 30 | 70 | — | 53 | 28 | 53 | 53 |
| Carbon black 2 | 9 | 9 | 9 | 10 | 2 | 5 | 5 | — | 9 | 5 | 9 | 9 |
| BET (m$^2$g) | 60 | 20 | 950 | 95 | 95 | 190 | 25 | — | 95 | 95 | 343 | 343 |
| DBP (ml/100 g) | 50 | 60 | 80 | 56 | 56 | 65 | 71 | — | 56 | 56 | 104 | 104 |

VC—VA copolymer: Vinyl chloride-vinyl acetate copolymer
*C: Comparative sample

TABLE 3

| Sample No. | RF output (dB) | Lumi S/N (dB) | Chroma S/N (dB) | Surface resistivity ($\Omega$/sq) | Drop-out (−12 dB, 15 $\mu$s) | Coefficient of kinetic friction | Shedding after running | Clog on head |
|---|---|---|---|---|---|---|---|---|
| 4 | 0.2 | 0.4 | 0.6 | $1 \times 10^{10}$ | 18 | 0.18 | A–B | None |
| 5 | 0.2 | 0.3 | 0.9 | $3 \times 10^{8}$ | 10 | 0.16 | A | None |
| 6 | 0.2 | 0.4 | 0.6 | $3 \times 10^{8}$ | 8 | 0.18 | A | None |
| 7 | 0.4 | 0.5 | 0.7 | $3 \times 10^{9}$ | 10 | 0.19 | A | None |
| 8 | 0.1 | 0.3 | 0.1 | $1 \times 10^{9}$ | 8 | 0.18 | A | None |
| 9 | 0.4 | 0.4 | 0.5 | $2 \times 10^{9}$ | 15 | 0.21 | A | None |
| 10 | 0.7 | 0.8 | 0.7 | $3 \times 10^{9}$ | 10 | 0.20 | A | None |
| 11 | 1.0 | 1.2 | 0.9 | $2 \times 10^{9}$ | 11 | 0.19 | A | None |
| 12 | 0.5 | 1.0 | 0.9 | $6 \times 10^{8}$ | 9 | 0.21 | A | None |
| 13 | 0.5 | 0.4 | 0.6 | $3 \times 10^{9}$ | 12 | 0.19 | A | None |
| 14 | 0.3 | 0.4 | 0.4 | $1 \times 10^{9}$ | 7 | 0.20 | B | None |
| 15 | 0.3 | 0.6 | 0.7 | $1 \times 10^{9}$ | 8 | 0.20 | A | None |
| 16 | 0.5 | 0.7 | 0.6 | $3 \times 10^{9}$ | 6 | 0.22 | A | None |
| 17 | 0.1 | 0 | 0.2 | $4 \times 10^{11}$ | 38 | 0.17 | B | None |
| 18 | 0.1 | −0.1 | 0 | $6 \times 10^{10}$ | 13 | 0.25 | B | None |
| C-4 | 0 | 0 | 0 | $4 \times 10^{8}$ | 7 | 0.20 | B | Present |
| C-5 | 0.6 | 0.5 | 0.6 | $1 \times 10^{10}$ | 51 | 0.31 | C | None |
| C-6 | 0 | −0.1 | 0.1 | $2 \times 10^{9}$ | 15 | 0.15 | A | Present |
| C-7 | 0.1 | 0 | 0 | $4 \times 10^{9}$ | 13 | 0.13 | A | Present |
| C-8 | 0.4 | 0.3 | 0.5 | $3 \times 10^{12}$ | 87 | 0.27 | C | Present |
| C-9 | −6.1 | −4.9 | — | $9 \times 10^{8}$ | 213 | 0.21 | C | Present |
| C-10 | 0.3 | 0.2 | 0.4 | $3 \times 10^{9}$ | 6 | 0.35 | B | Present |
| C-11 | −0.5 | −0.6 | −0.8 | $4 \times 10^{9}$ | 6 | 0.19 | C | Present |
| C-12 | −1.5 | −1.0 | −1.5 | $3 \times 10^{8}$ | 8 | 0.20 | B | Present |

Figure 4:
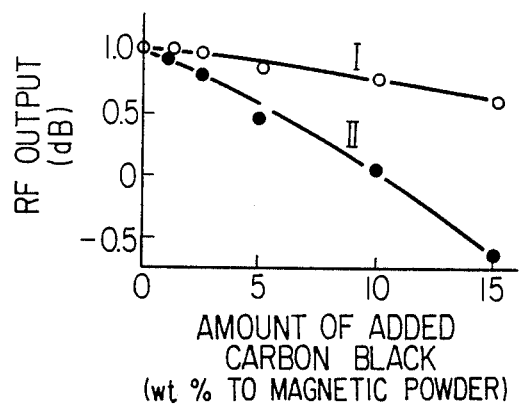
FIG. 4 is a graph showing changes in the output according to the added amount of two different carbon blacks.

From these results it is understood that the samples according to this invention, particularly those samples in which two different carbon blacks are used together, are excellent in the following points:

(1) A high-level electromagnetic conversion property can be obtained.
(2) A surface resistivity (conductivity) of not more than $1 \times 10^{10}$ $\Omega$/sq can be obtained. As a result, dust hardly deposits onto the surface, leading to the reduction of drop-out.
(3) The coefficient of friction of the surface of the magnetic layer can be reduced. Consequently, a recording medium excellent in the running endurance can be obtained.
(4) The coefficient of kinetic friction is especially small, so that the shedding in the repeated run of the magnetic tape hardly occurs.
(5) The electromagnetic conversion property is never declined even in a large amount of the carbon blacks, so that the reduction in the layer thickness of, e.g., 8 mm video tape, can be accomplished. Also, in the foregoing compositions of Sample 7 and of Comparative Sample 4, the respective total amounts of the first and second carbon blacks with their proportion kept intact were varied, and the RF output values thereof were measured, and the obtained results are shown in the form of Curve I and Curve II in FIG. 4. As is apparent from the curves, the example according to this invention shows a significantly small decline of the output despite the large adding amount of the carbon blacks as compared with the comparative example.

Figure 5:
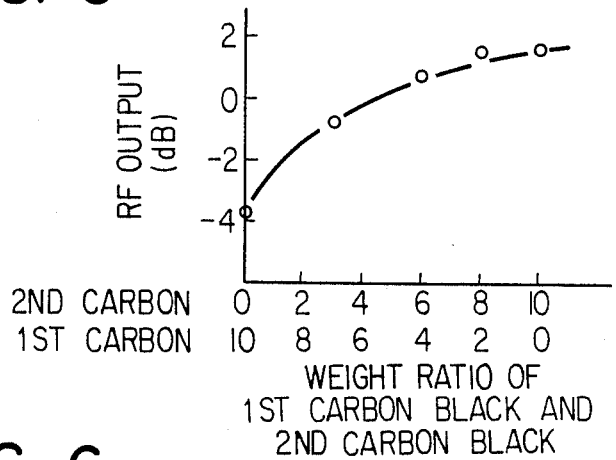
FIGS. 5 and 6 are graphs showing changes in the characteristics according to the proportion of both carbon blacks.
Figure 6:
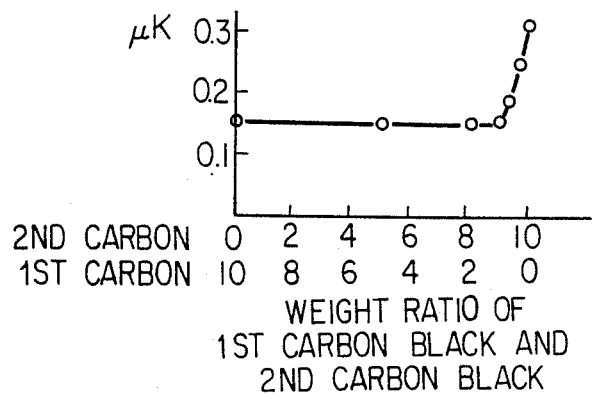

In using the above second and first carbon blacks in combination, when the proportion of both carbon blacks was varied as shown in FIG. 5 and FIG. 6, low coefficient of friction-having recording mediums with no deterioration of their electromagnetic conversion property were able to be obtained in the second carbon black: the first carbon black proportion-by-weight range of from (5:5) to (9.99:0.01).

As has been described, high output cannot be obtained unless the BET value of the second carbon black is from 50 m$^2$/g up to 900 m$^2$/g, and can be improved on condition that its oil absorption is less than 110 ml/100 g, and further, the coefficient of friction can be largely reduced when the BET value of the first carbon black is from 15 m$^2$/g up to 80 m$^2$/g, and the surface resistivity can be lowered as long as its oil absorption is not less than 110 ml/100 g. Thus, it is understood how significantly advantageous it is to limit these characteristics to the specified ranges of this invention.

What is claimed is:

1. A magnetic recording medium comprising a nonmagnetic support having thereon a magnetic recording layer comprising a magnetic layer containing ferromagnetic metal powder wherein said ferromagnetic metal powder contains aluminum and has a BET specific surface area of not less than 40 m$^2$/g and said magnetic recording layer contains a fatty acid having a neutralization value of not more than 250, an ester of fatty acid and a carbon black having a DBP oil absorption of not less than 110 ml/100 g and an average particle size of not more than 60 mμ.

2. The magnetic recording medium of claim 1, wherein the BET specific surface area of said ferromagnetic metal powder is within the range of from 45 m$^2$/g to 90 m$^2$/g.

3. The magnetic recording medium of claim 1, wherein the total amount of said fatty acid and said fatty acid ester is not more than 10 parts per 100 parts by weight of said ferromagnetic metal powder contained in said magnetic recording layer.

4. The magnetic recording medium of claim 3, wherein the total amount of said fatty acid and said fatty acid ester is from 1 to 9 parts per 100 parts by weight of said ferromagnetic metal powder contained in said magnetic recording layer.

5. The magnetic recording medium of claim 1, wherein the neutralization value of said fatty acid is from 110 to 250.

6. The magnetic recording medium of claim 1, Wherein the BET specific surface area of said carbon black is from 15 m$^2$/g to 80 m$^2$/g.

7. The magnetic recording medium of claim 1, wherein the DBP oil absorption value of said carbon black is from 111 ml/100 g to 500 ml/100 g.

8. The magnetic recording medium of claim 1, wherein the DBP oil absorption value of said carbon black is from 160 ml/100 g to 300 ml/100 g.

9. The magnetic recording medium of claim 1, wherein the amount of said carbon black contained in said magnetic recording layer is from 0.1 to 6 parts per 100 parts by weight of said ferromagnetic metal powder contained in said magnetic recording layer.

10. The magnetic recording medium of claim 1, wherein said magnetic recording layer contains another carbon black having a DBP oil absorption of less than 110 ml/100 g and a BET specific surface of from 50 m$^2$/g to 900 m$^2$/g.

11. The magnetic recording medium of claim 10, wherein the BET specific surface area of said ferromagnetic metal powder is from 45 m$^2$/g to 90 m$^2$/g.

12. The magnetic recording medium of claim 10, wherein the total amount of said fatty acid and said fatty acid ester is not more than 10 parts per 100 parts by weight of said ferromagnetic metal powder contained in said magnetic recording layer.

13. The magnetic recording medium of claim 12, wherein the total amount of said fatty acid and said fatty acid ester is from 1 to 9 parts per 100 parts by weight of said ferromagnetic metal powder contained in said magnetic recording layer.

14. The magnetic recording medium of claim 10, wherein the neutralization value of said fatty acid is from 110 to 250.

15. The magnetic recording medium of claim 10, wherein the BET specific surface area of said carbon black is from 15 m$^2$/g to 80 m$^2$/g.

16. The magnetic recording medium of claim 10, wherein the DBP oil absorption of said carbon black is from 111 ml/100 g to 500 ml/100 g.

17. The magnetic recording medium of claim 10, wherein the DBP oil absorption of said carbon black is from 160 ml/100 g to 300 ml/100 g.

18. The magnetic recording medium of claim 10, wherein the amount of said carbon black contained in said magnetic recording layer is from 0.1 to 6 parts per 100 parts by weight of said ferromagnetic metal powder contained in said magnetic recording layer.

19. The magnetic recording medium of claim 10, wherein the BET specific surface area of said another carbon black is from 50 m$^2$/g to 400 m$^2$/g.

20. The magnetic recording medium of claim 10, wherein the DBP oil absorption of said another carbon black is from 20 ml/100 g up to 110 ml/100 g.

21. The magnetic recording medium of claim 10, wherein the total amount of said carbon black and said another carbon black is from 1 to 20 parts per 100 parts by weight of said ferromagnetic metal powder contained in said magnetic recording layer.

22. The magnetic recording medium of claim 21, wherein the total amount of said carbon black and said another carbon black is from 1.5 to 15 parts per 100 parts by weight of said ferromagnetic metal powder contained in said magnetic recording layer.

23. The magnetic recording medium of claim 22, wherein the total amount of said carbon black and said another carbon black is from 2 to 10 parts per 100 parts by weight of said ferromagnetic metal powder contained in said magnetic recording layer.

24. The magnetic recording medium of claim 10, wherein the proportion by weight of said carbon black to said another carbon black is in the range of from 5:5 to 0.01:9.99.

* * * * *